(12) United States Patent
Kaczowski et al.

(10) Patent No.: US 9,211,928 B2
(45) Date of Patent: Dec. 15, 2015

(54) MOTORCYCLE SADDLEBAG

(71) Applicant: Dowco, Inc., Manitowoc, WI (US)

(72) Inventors: Michael J. Kaczowski, Manitowoc, WI (US); Timothy J. LaFleur, Manitowoc, WI (US); Troy M. Zaskowski, West Bend, WI (US)

(73) Assignee: Dowco, Inc., Manitowoc, WI (US)

( * ) Notice: Subject to any disclaimer, the term of this patent is extended or adjusted under 35 U.S.C. 154(b) by 144 days.

(21) Appl. No.: 14/081,603

(22) Filed: Nov. 15, 2013

(65) Prior Publication Data
US 2014/0069974 A1 Mar. 13, 2014

Related U.S. Application Data

(63) Continuation of application No. 13/430,939, filed on Mar. 27, 2012, now Pat. No. 8,608,039, which is a continuation of application No. 13/088,990, filed on Apr. 18, 2011, now Pat. No. 8,167,181, which is a
(Continued)

(51) Int. Cl.
*B62J 9/00* (2006.01)

(52) U.S. Cl.
CPC ... *B62J 9/00* (2013.01); *B62J 9/006* (2013.01); *Y10T 29/4984* (2015.01); *Y10T 29/49622* (2015.01); *Y10T 29/49826* (2015.01)

(58) Field of Classification Search
CPC .............. B62J 9/00; B62J 9/001; B62J 9/006; B62J 7/04; B62J 7/08
USPC ................. 224/413, 428–430, 433, 435, 431; 220/4.21, 604, 612, 613, 669, 675, 220/678, 845, 847, 848, 680; 190/19, 21, 190/124, 109; 229/122.23
See application file for complete search history.

(56) References Cited

U.S. PATENT DOCUMENTS 544,640 A 8/1895 Leonard
575,536 A 1/1897 Swanson
(Continued)

FOREIGN PATENT DOCUMENTS

EP 0245541 11/1987
EP 1295784 3/2003
(Continued)

OTHER PUBLICATIONS

BB Reporductions Thermoformed Saddlebag (Available at least as early as Mar. 16, 2009).
(Continued)

*Primary Examiner* — Adam Waggenspack
(74) *Attorney, Agent, or Firm* — Shane Delsman; Godfrey & Kahn, S.C.

(57) ABSTRACT

A motorcycle saddlebag includes an outer panel having a forward portion that defines a forward edge, a rearward portion that defines a rearward edge, and a side portion that defines a lower edge. The outer panel includes an inner surface. The inner panel is received by the outer panel and includes a back wall and a bottom wall. The back and bottom walls define an engagement surface that engages the inner surface of the outer panel and extends along and engages the forward portion, the side portion, and the rearward portion. When the saddlebag is attached to the motorcycle, the forward and rearward edges are positioned nearer a rear fender portion than the back wall and the engagement surface, and the lower edge is positioned below the bottom wall and the engagement surface. The lid is pivotally coupled to either of the outer panel and the inner panel.

4 Claims, 7 Drawing Sheets

Related U.S. Application Data continuation of application No. 12/821,804, filed on Jun. 23, 2010, now Pat. No. 7,926,687, which is a continuation of application No. 12/623,914, filed on Nov. 23, 2009, now abandoned.

(60) Provisional application No. 61/169,381, filed on Apr. 15, 2009.

(56) References Cited

U.S. PATENT DOCUMENTS

| | | |
|---|---|---|
| 595,959 A | 12/1897 | Marshall |
| 1,075,369 A | 10/1913 | Millice |
| 1,963,333 A | 6/1934 | Morales |
| 2,389,601 A | 11/1945 | De Witt |
| 2,423,003 A | 6/1947 | Buegeleisen |
| 2,436,991 A | 3/1948 | Dirksen |
| 2,491,062 A | 12/1948 | Shephard |
| 2,527,433 A | 10/1950 | La Rochelle |
| 2,553,739 A | 5/1951 | Ashdowne |
| D163,701 S | 6/1954 | La Rochelle |
| 2,701,728 A | 2/1955 | Miller |
| 2,783,927 A | 3/1957 | Harley |
| 3,462,208 A | 8/1969 | Black et al. |
| 3,504,830 A | 4/1970 | Trammell, Jr. |
| 3,526,314 A | 9/1970 | Trammell, Jr. |
| 3,565,305 A | 2/1971 | Belokin, Jr. |
| 3,963,158 A | 6/1976 | Clenet |
| 4,019,674 A | 4/1977 | Ikelheimer et al. |
| 4,050,615 A | 9/1977 | Kline |
| 4,081,117 A | 3/1978 | Crane |
| D247,775 S | 4/1978 | Watson-O'Hara |
| D254,062 S | 1/1980 | Anton |
| 4,241,857 A | 12/1980 | Perethian et al. |
| D259,192 S | 5/1981 | Beaubien et al. |
| 4,271,996 A | 6/1981 | Montgomery |
| D262,103 S | 12/1981 | Beaubien et al. |
| 4,367,829 A | 1/1983 | Kusz |
| 4,375,828 A | 3/1983 | Biddison |
| 4,387,835 A | 6/1983 | Golzer |
| 4,442,960 A | 4/1984 | Vetter |
| D274,899 S | 7/1984 | Perethian et al. |
| 4,460,114 A | 7/1984 | Grenier |
| 4,544,093 A | 10/1985 | Stark et al. |
| D282,061 S | 1/1986 | Abe |
| 4,643,343 A | 2/1987 | Goldman et al. |
| 4,690,237 A | 9/1987 | Funabashi et al. |
| 4,726,439 A | 2/1988 | Iwao et al. |
| 4,802,682 A | 2/1989 | Yasuji |
| D300,427 S | 3/1989 | Yamada et al. |
| 4,813,583 A | 3/1989 | Carpenter |
| 4,854,461 A | 8/1989 | Daniel et al. |
| 4,971,243 A | 11/1990 | Lisiecki |
| 4,979,658 A | 12/1990 | Baker |
| 5,127,563 A | 7/1992 | Chan et al. |
| 5,205,413 A | 4/1993 | Cautereels et al. |
| 5,222,642 A | 6/1993 | Solarz |
| 5,285,935 A | 2/1994 | Hsueh |
| D347,819 S | 6/1994 | Katz |
| 5,529,156 A | 6/1996 | Yang |
| 5,615,922 A | 4/1997 | Blanchard |
| 5,667,117 A | 9/1997 | Nutto |
| 5,685,403 A | 11/1997 | Morszeck |
| 5,697,538 A | 12/1997 | Goldenberg et al. |
| 6,029,875 A | 2/2000 | Johnston |
| 6,085,671 A | 7/2000 | Kerr et al. |
| 6,090,339 A | 7/2000 | Raboin |
| 6,179,183 B1 | 1/2001 | Kloster |
| 6,223,960 B1 | 5/2001 | Powell et al. |
| D445,398 S | 7/2001 | Hanagan |
| 6,332,639 B1 | 12/2001 | Tanaka et al. |
| 6,338,260 B1 | 1/2002 | Cousins et al. |
| 6,349,783 B1 | 2/2002 | Galbraith et al. |
| D454,532 S | 3/2002 | Lourens |
| 6,401,996 B1 | 6/2002 | Thom et al. |
| D461,761 S | 8/2002 | Monson |
| D462,934 S | 9/2002 | Itakura et al. |
| D465,762 S | 11/2002 | Wargin et al. |
| 6,499,784 B2 | 12/2002 | Takahashi |
| 6,505,765 B1 | 1/2003 | Proctor et al. |
| D470,097 S | 2/2003 | Song |
| 6,520,275 B2 | 2/2003 | Galbraith et al. |
| 6,595,334 B1 | 7/2003 | Saetia |
| D479,185 S | 9/2003 | Hanagan |
| 6,612,413 B2 | 9/2003 | Kuwayama |
| 6,651,792 B1 | 11/2003 | Kuwayama |
| D497,341 S | 10/2004 | Hanagan |
| 6,832,710 B2 | 12/2004 | Galbraith et al. |
| D506,968 S | 7/2005 | Berardino et al. |
| D512,953 S | 12/2005 | Wilcox |
| D519,427 S | 4/2006 | Haddock |
| 7,044,424 B2 | 5/2006 | Robertson et al. |
| 7,207,470 B2 | 4/2007 | Akita et al. |
| D550,146 S | 9/2007 | Hanagan |
| 7,311,232 B2 | 12/2007 | Watanabe et al. |
| D579,404 S | 10/2008 | McLaughlin |
| D585,358 S | 1/2009 | Hanagan et al. |
| D585,359 S | 1/2009 | Hanagan et al. |
| D585,360 S | 1/2009 | Hanagan et al. |
| D600,190 S | 9/2009 | Sharpe, Jr. |
| 7,628,120 B2 | 12/2009 | Beeler |
| 2001/0030215 A1 | 10/2001 | Vincenzo |
| 2002/0005421 A1 | 1/2002 | Campbell |
| 2002/0032253 A1 | 3/2002 | Lorenz et al. |
| 2002/0053584 A1 | 5/2002 | Izawa et al. |
| 2002/0121534 A1 | 9/2002 | Hanagan |
| 2003/0010798 A1 | 1/2003 | Galbraith et al. |
| 2004/0011840 A1 | 1/2004 | Lovett |
| 2004/0118889 A1 | 6/2004 | Hamilton |
| 2004/0149792 A1 | 8/2004 | Akita et al. |
| 2004/0164113 A1 | 8/2004 | Thomas et al. |
| 2004/0238581 A1 | 12/2004 | Lindsey et al. |
| 2005/0150921 A1 | 7/2005 | Schneider |
| 2006/0162978 A1 | 7/2006 | Thompson et al. |
| 2006/0163302 A1 | 7/2006 | Knoch et al. |
| 2006/0186159 A1 | 8/2006 | Lawrence |
| 2007/0102469 A1 | 5/2007 | Roth |
| 2008/0073397 A1 | 3/2008 | Rehschuh |
| 2008/0083801 A1 | 4/2008 | Knoch et al. |
| 2008/0174099 A1 | 7/2008 | Brown |
| 2008/0178642 A1 | 7/2008 | Sanders |
| 2009/0001114 A1 | 1/2009 | Sonnetag et al. |
| 2009/0140017 A1 | 6/2009 | Boyd et al. |
| 2010/0025443 A1 | 2/2010 | Racz et al. |

FOREIGN PATENT DOCUMENTS

| | | |
|---|---|---|
| FR | 2368395 | 5/1978 |
| FR | 2562861 | 6/1986 |
| JP | 9109964 | 4/1997 |
| JP | 11129954 | 5/1999 |
| JP | 11-227653 | 8/1999 |
| JP | 2004122876 | 4/2004 |
| JP | 2004322932 | 11/2004 |
| JP | 2007276673 | 10/2007 |
| JP | 2007302227 | 11/2007 |

OTHER PUBLICATIONS

National Cycle Cruiseliner Saddlebag Model No. N1101 (Available at least as early as Mar. 16, 2009).

Road Krome Frisco ABS Rigid Bolt-On Removable Saddlebages, www.classiccruiser.com/product.asp?item=586457 (Available online at least as early as Mar. 25, 2009).

International Search Report and Written Opinion, International Patent Application No. PCT/US2010/030916, mailed Jun. 15, 2010.

"Dowco Body-Saddlebag LH (007E)" Apr. 31, 2006.

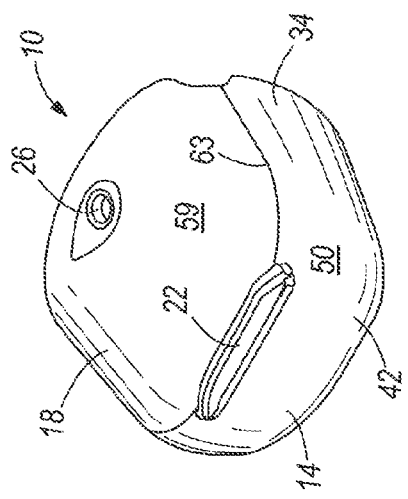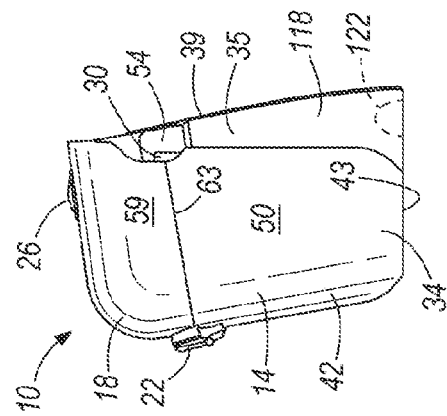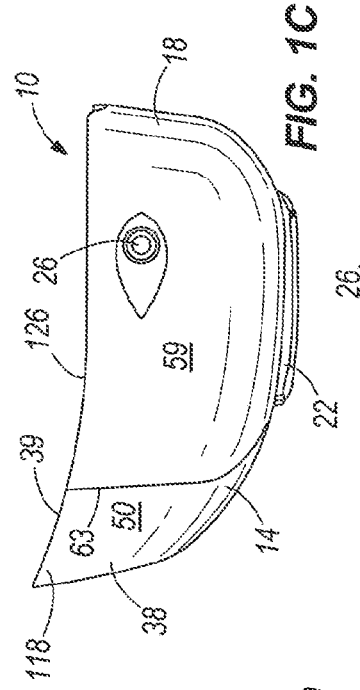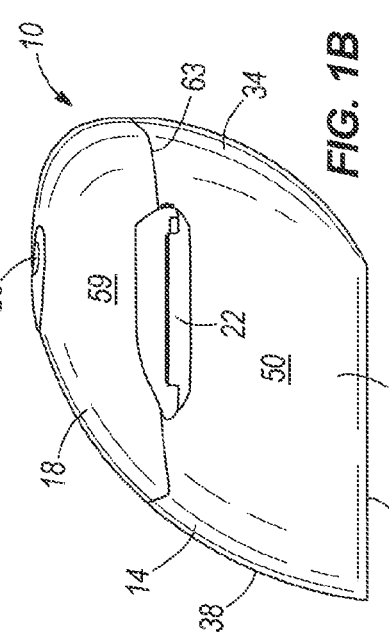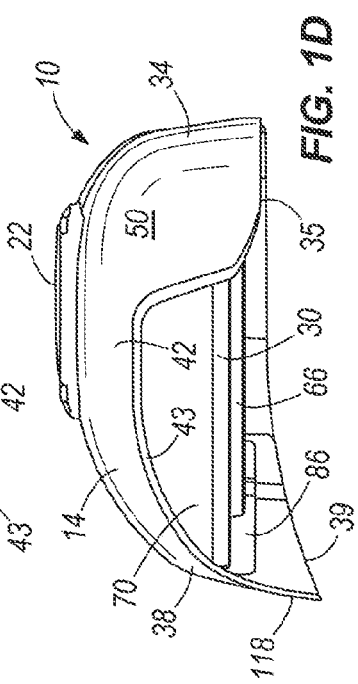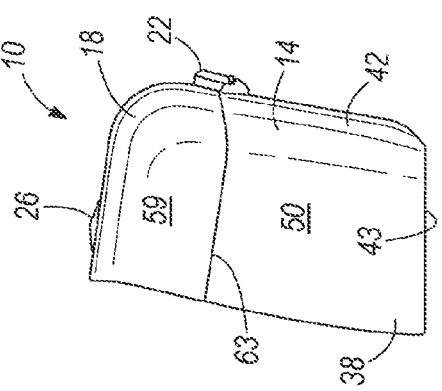

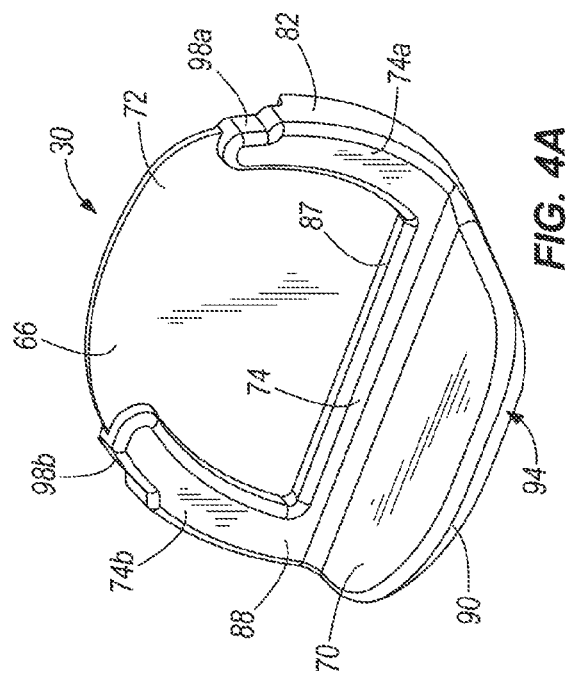
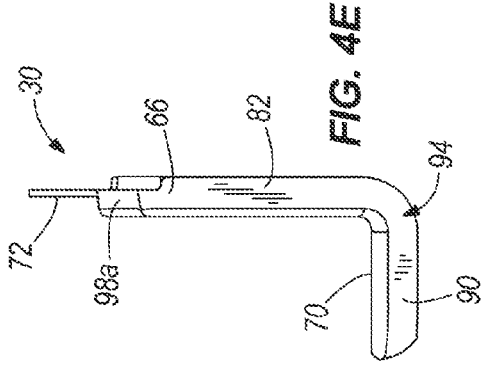
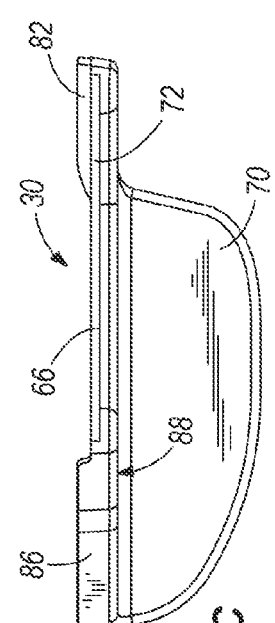
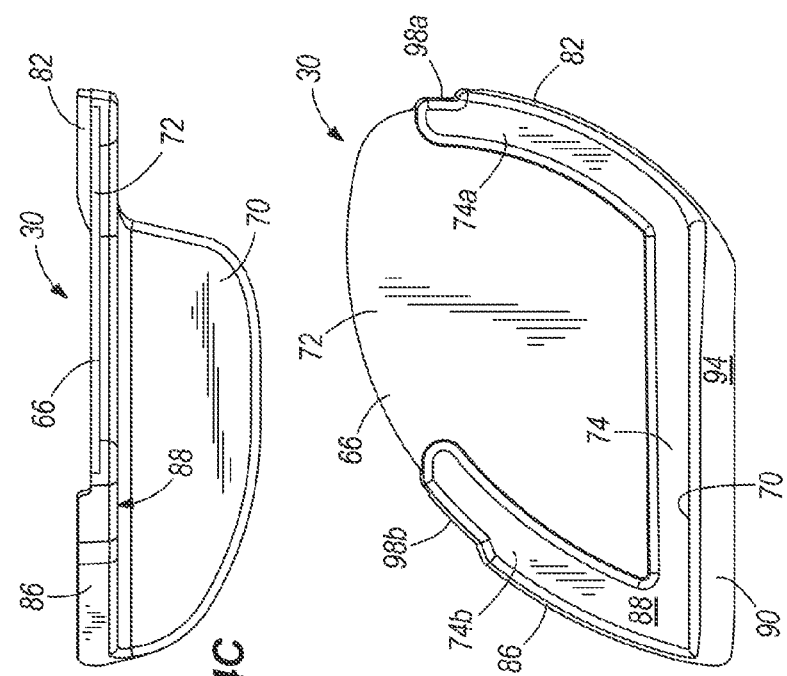
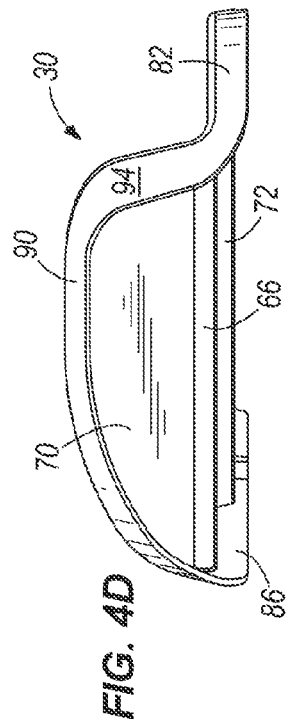

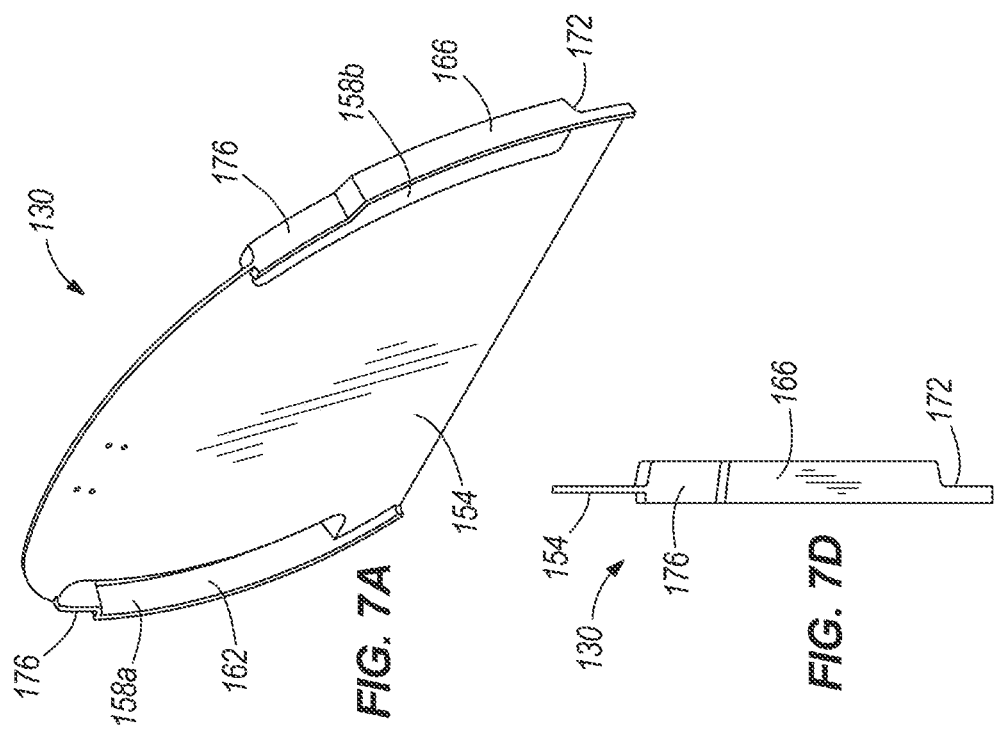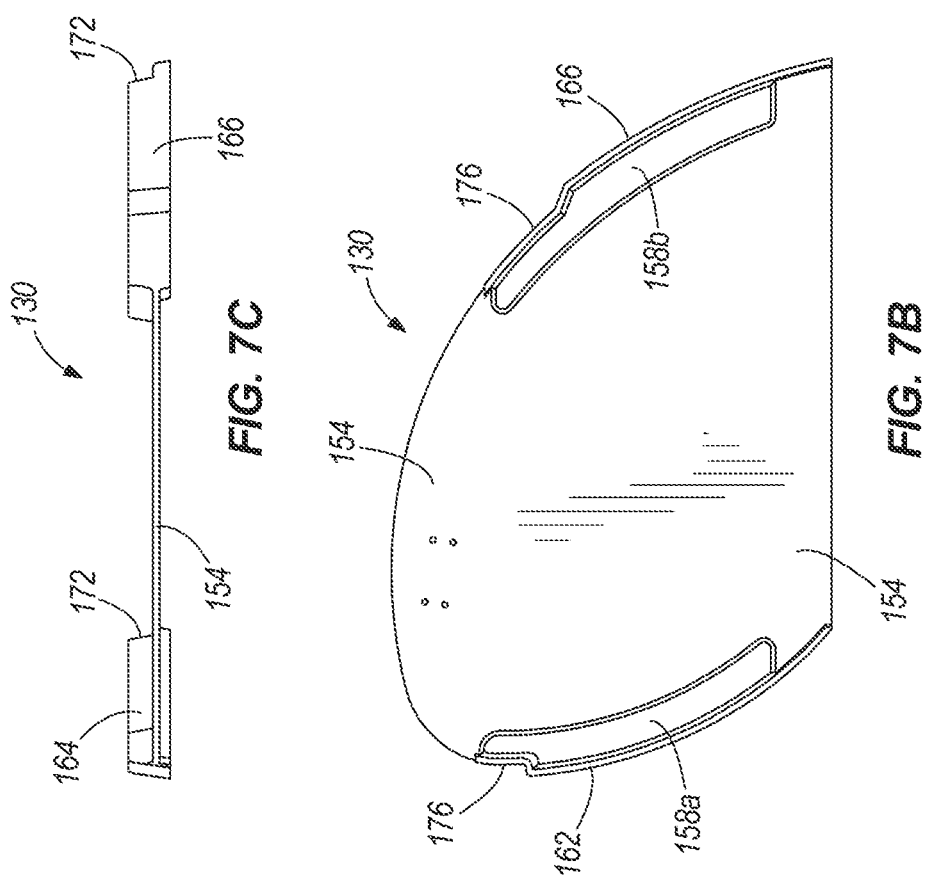

MOTORCYCLE SADDLEBAG

CROSS REFERENCE TO RELATED APPLICATION

This application is a continuation of U.S. patent application Ser. No. 13/430,939, filed Mar. 27, 2012 and published as U.S. Patent Application Publication No. 2012/0187168 on Jul. 26, 2012. U.S. patent application Ser. No. 13/430,939 is a continuation of U.S. patent application Ser. No. 13/088,990, filed Apr. 18, 2011 and published as U.S. Patent Application Publication No. 2011/0192872 on Aug. 11, 2011. U.S. patent application Ser. No. 13/088,990 is a continuation of U.S. patent application Ser. No. 12/821,804, filed Jun. 23, 2010, which issued as U.S. Pat. No. 7,926,687 on Apr. 19, 2011. U.S. patent application Ser. No. 12/821,804 is a continuation of U.S. patent application Ser. No. 12/623,914, filed Nov. 23, 2009, and published as U.S. Patent Application Publication No. 2010/0264183 on Oct. 21, 2010, which claims the benefit of and priority to U.S. Provisional Patent Application No. 61/169,381, filed Apr. 15, 2009. The entire contents of the patent, applications, and publications identified above are hereby incorporated by reference.

FIELD OF THE INVENTION

The present invention relates to a saddlebag for a motorcycle, and more particularly to a motorcycle saddlebag formed of a plurality of panels.

BACKGROUND

Motorcycle saddlebags are known for enhancing the styling and storage capacity of motorcycles. Saddlebags typically are installed on each side of the motorcycle rear fender, placing them in a prominent location that can significantly affect the overall aesthetics of the motorcycle. For this reason, one concern of motorcycle saddlebag design is that the saddlebag compliments the overall styling of the motorcycle. In this regard, when choosing saddlebag materials, designers frequently base decisions on characteristics such as the quality of the surface finish that can be obtained and the paintability of the final product. Similarly, when choosing a saddlebag manufacturing process, designers frequently base decisions on the ability of the process to efficiently create curves, arcs, and other geometry that will compliment the overall look of the motorcycle. In some cases, because of limitations associated with certain materials and the processes used to fabricate products from those materials, designers must balance the frequently conflicting requirements of obtaining a quality surface finish with good paintability against the need to achieve complex part geometries using an efficient manufacturing process.

SUMMARY

In some aspects, the invention may include a motorcycle saddlebag for attachment to a motorcycle at a location adjacent a rear fender portion. The saddlebag includes an outer panel including a forward portion that defines a forward edge, a rearward portion that defines a rearward edge, and a side portion that cooperates to define a lower edge. The forward and rearward portions each curve toward and smoothly transition into the side portion. The outer panel also includes an inner surface that is bounded by the forward edge, the rearward edge, and the lower edge. The outer panel receives an inner panel, which includes a back wall and a bottom wall. The back wall faces the rear fender portion when the motorcycle saddlebag is attached to the motorcycle, and includes at least a portion of the back wall that extends substantially perpendicular to at least a portion of the bottom wall. The back and bottom walls cooperate to define an engagement surface that matingly engages the inner surface of the outer panel, and that extends along and engages the forward portion, the side portion, and the rearward portion. When the motorcycle saddlebag is attached to the motorcycle, the forward and rearward edges are positioned nearer the rear fender portion than the back wall and the engagement surface, and the lower edge is positioned below the bottom wall and the engagement surface. The saddle bag additionally includes a lid that is pivotally coupled to at least one of the outer panel and the inner panel.

In other aspects, the invention may include a motorcycle saddlebag for attachment to a motorcycle at a location adjacent a rear fender portion of the motorcycle including an outer panel, an inner panel and a lid. The outer panel includes a forward portion, a rearward portion, and a side portion such that the forward and rearward portions each curve toward and smoothly transition into the side portion. The forward portion defines a forward edge, the rearward portion defines a rearward edge, and the forward portion, the rearward portion and the side portion cooperate to define a lower edge. The outer panel additionally includes an inner surface at least partially bounded by the forward edge, the rearward edge, and the lower edge. The inner portion is joined to the outer panel and is substantially L-shaped. The inner panel includes a back wall and a bottom wall. The back wall faces the rear fender portion when the motorcycle saddlebag is attached to the motorcycle, and defines on one end a generally forwardly-facing flange and on an opposite end a generally rearwardly-facing flange. The bottom wall defines a generally outwardly-facing flange. The forwardly-facing flange, the rearwardly-facing flange, and the outwardly-facing flange are each matingly engaged with and secured to the inner surface of the outer panel. When the motorcycle saddlebag is attached to the motorcycle, the forward and rearward edges are positioned nearer the rear fender portion than the back wall and the engagement surface, and the lower edge is positioned below the bottom wall and the engagement surface. The saddlebag additionally includes a lid that is pivotally coupled to at least one of the outer panel and the inner panel.

In other aspects, the invention may provide a method of making a motorcycle saddlebag. The method includes forming a generally U-shaped outer panel having a forward portion, a side portion, and a rearward portion. The forward portion, the side portion, and the rearward portion together define a curved inner surface. The method also includes forming a generally L-shaped inner panel including a back wall and a bottom wall. The back wall defines a generally forwardly-facing flange and a generally rearwardly-facing flange. The bottom wall defines a generally outwardly-facing flange. The forwardly-facing flange, the rearwardly-facing flange, and the outwardly-facing flange together define an engagement surface. The method further includes applying structural adhesive to at least one of the inner surface and the engagement surface, and, after applying structural adhesive, engaging the engagement surface with the inner surface to couple the inner panel to the outer panel. Engaging the engagement surface with the inner surface includes engaging the forwardly-facing flange with the inner surface at the forward portion, engaging the rearwardly-facing flange with the inner surface at the rearward portion, and engaging the outwardly-facing flange with the inner surface at the side portion.

BRIEF DESCRIPTION OF THE DRAWINGS

FIGS. 1A-1F are perspective, right side, top, bottom, front, and rear views, respectively, of a motorcycle saddlebag.

FIGS. 4A-4E are perspective, right side, top, bottom, and front views, respectively, of an inner panel of the motorcycle saddlebag of FIG. 1.

FIGS. 7A-7D are perspective, left side, top, and rear views, respectively, of an inner panel of the motorcycle saddlebag of FIG. 6.

Figure 2:
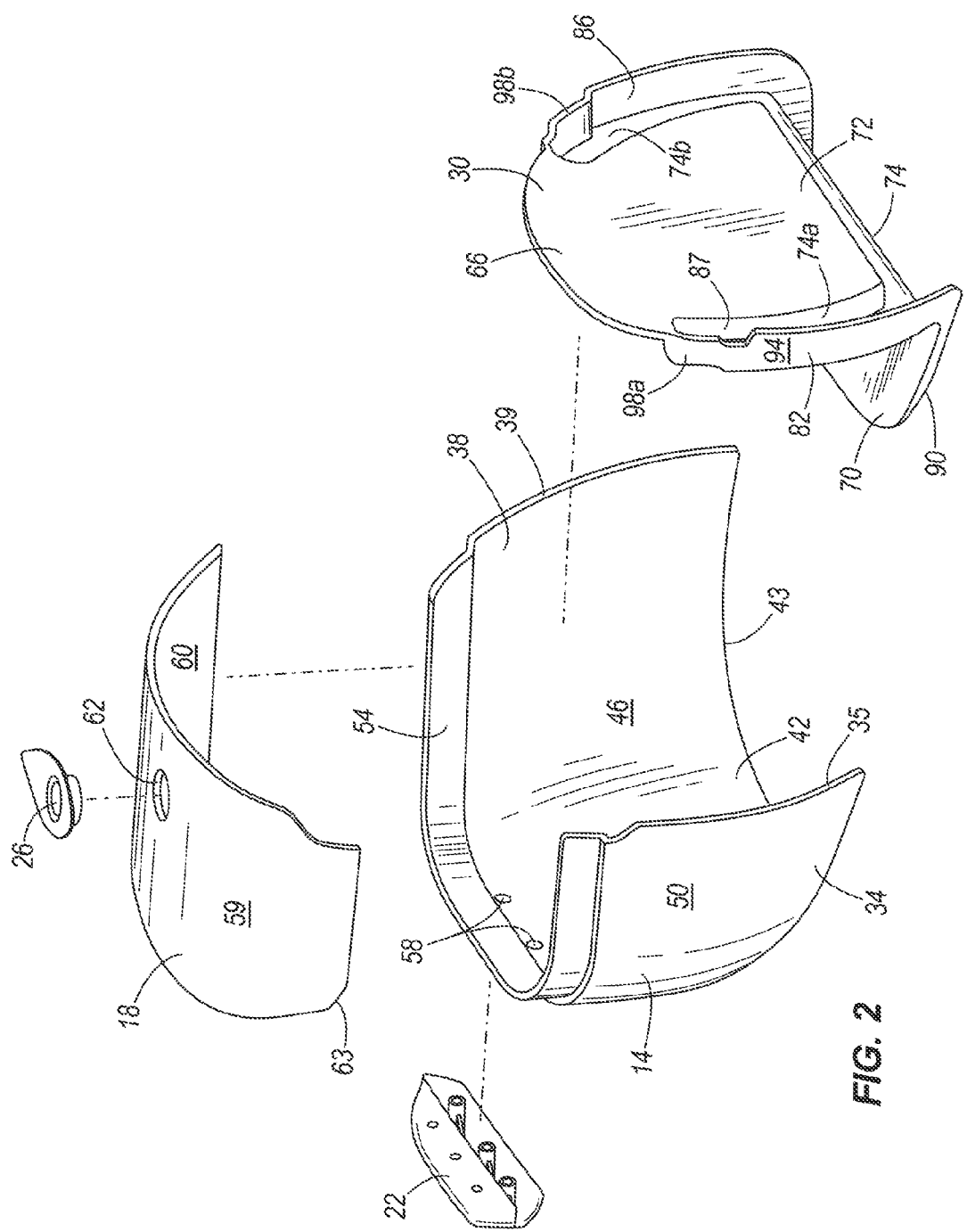
FIG. 2 is an exploded perspective view of the motorcycle saddlebag of FIG. 1.
Figure 3A:
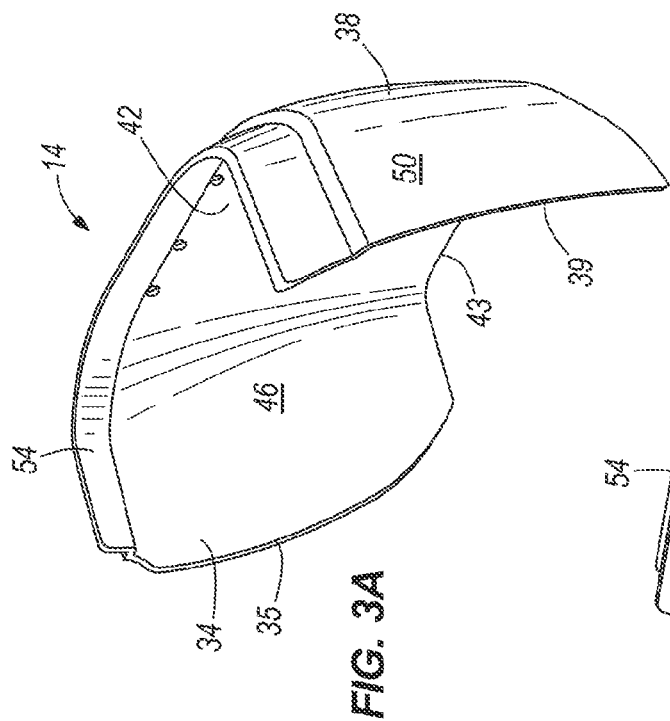
FIGS. 3A-3D are perspective, left side, top, and rear views, respectively, of an outer panel of the motorcycle saddlebag of FIG. 1.
Figure 3D:
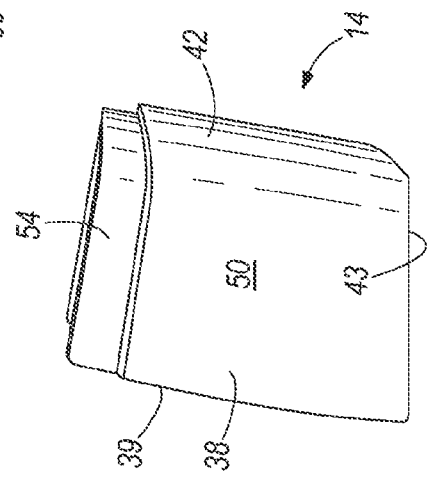
Figure 3C:
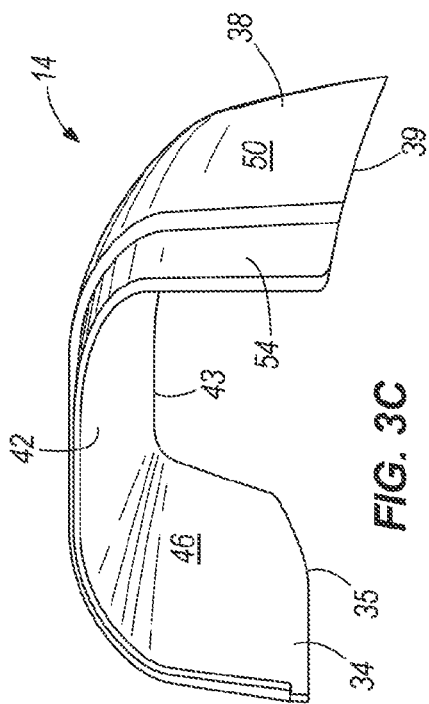
Figure 3B:
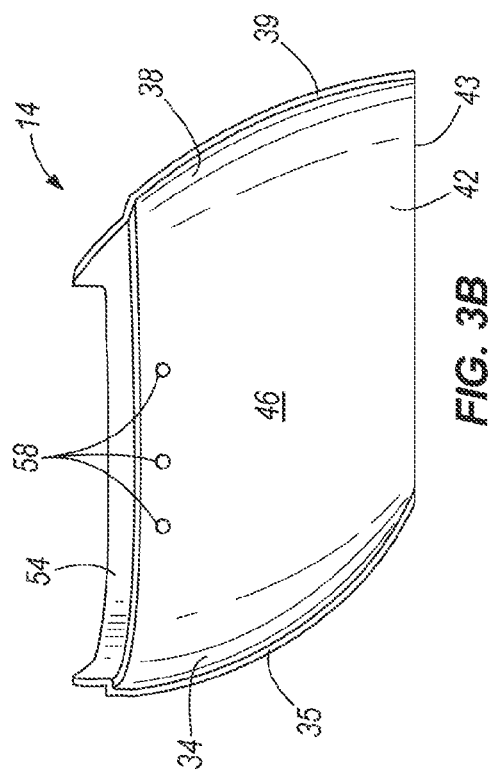

It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

The following description is directed to embodiments of an individual motorcycle saddlebag. Directional references such as front, rear, top, bottom, left, and right, refer to the front, rear, left, and right of a motorcycle to which the saddlebag might be attached. The Figures depict a saddlebag configured for attachment to the right-hand side of a motorcycle. It should be appreciated however that saddlebags typically are provided in pairs, and that the lefthand saddlebag will in many cases be a substantial mirror-image of the right-hand saddlebag.

FIGS. 1A-1F illustrate a motorcycle saddlebag 10 formed from a plurality of thermoformed panels joined by structural adhesive. Although the illustrated panels are formed by thermoforming, other known manufacturing techniques, including various molding techniques (e.g., injection molding), may also be utilized. The saddlebag 10 includes an outer panel 14 and a lid 18 pivotally coupled to the outer panel 14 by a hinge 22. The lid 18 includes a latch assembly 26 for securing the lid 18 in a closed position. An inner panel 30 (FIG. 1D) is bonded to the outer panel 14 by structural adhesive, as discussed further below, and cooperates with the outer panel 14 to define a storage volume within the saddlebag 10.

With reference also to FIGS. 2 and 3A-3D, the outer panel 14 is generally U-shaped when viewed from the top or bottom, and includes a generally forwardly-facing front portion 34, a generally rearwardly-facing rear portion 38, and a generally outwardly-facing side portion 42 extending between the front and rear portions 34, 38. The front portion 34 defines a forward edge 35 of the outer panel 14, and the rear portion 38 defines a rearward edge 39 of the outer panel 14. The front portion 34, the rear portion 38, and the side portion 42 cooperate to define a lower edge 43 of the outer panel 14. The outer panel 14 also includes an inner surface 46, and an outer surface 50. The inner and outer surfaces 46, 50 are both substantially smooth, continuous surfaces that extend from the front portion 34 around and through the side portion 42, and around and through the rear portion 38 of the outer panel 14. A ridge 54 extends along an upper edge of the front, rear, and side portions 34, 38, 42, and is recessed relative to the outer surface 50. The outer panel 14 defines a plurality (e.g. three, as illustrated) of mounting apertures 58 in the side portion 42. The mounting apertures 58 extend in a line substantially parallel to and slightly spaced from the ridge 54. The mounting apertures 58 are used to secure the hinge 22 to the outer panel 14. Similar apertures (not shown) are provided in the lid 18 for securing the hinge 22 to the lid 18.

Like the outer panel 14, the lid 18 also includes an outer surface 59 and an inner surface 60. The lid 18 receives the ridge 54 of the outer panel 14 when the lid 18 is closed. The ridge 54 fits inside the lid 18 to provide a smooth transition between the outer surface 56 of the lid 18 and the outer surface 50 of the outer panel 14 (see, e, g., FIG. 1B). The lid 18 further defines an opening 62 that receives the latch assembly 26, and a lower edge 63 that surrounds the ridge 54 and substantially aligns with the outer surface 50 of the outer panel 14 when the lid is 18 closed.

With reference to FIGS. 2 and 4A-4E, the inner panel 30 includes a generally L shaped cross-section (see FIG. 4E) and defines a back wall portion 66 and a bottom wall portion 70 that extends substantially perpendicular to the back wall portion 66. The back wall portion 66 includes a substantially planar back panel 72, and a generally U-shaped dished portion 74 that adds rigidity to the inner panel. When viewed from the left-hand side of the inner panel 30 (see FIG. 2), the dished portion 74 is recessed relative to the back panel 72.

The dished portion 74 includes a forward portion 74a that defines a generally forwardly-facing flange 82, and a rearward portion 74b that defines a generally rearwardly facing flange 86. More specifically, the dished portion 74 includes a lip 87 that extends substantially perpendicularly from the front, rear, and lower edges of the back panel 72. An interior surface 88 of the dished portion 74 extends generally outwardly from the lip 87 and is spaced from and substantially parallel to the back panel 72. The forwardly-facing flange 82 extends substantially perpendicularly from a forward portion of the interior surface 88, and the rearwardly-facing flange 86 extends substantially perpendicularly from a rearward portion of the interior surface 88. The forwardly-facing and rearwardly-facing flanges 82, 86 extend from the interior surface 88 toward and slightly beyond the back panel 72 (see FIG. 4E). A lower portion of the interior surface 88 transitions smoothly via a radius into the bottom wall portion 70.

The bottom wall portion 70 of the inner panel 30 includes around its periphery a generally outwardly-facing and downwardly-extending flange 90. The forwardly-facing and rearwardly-facing flanges 82, 86 of the back wall portion 66 and the outwardly-facing and downwardly-extending flange 90 of the bottom wall portion 70 are configured to blend smoothly into one another. In this way, the flanges 82, 86, 90 cooperate to define a single, smoothly contoured engagement surface 94 that substantially corresponds to the contours of the inner surface 46 of the outer panel 14. Specifically, when the inner panel 30 is received by the outer panel 14, substantially the entire engagement surface 94 mates against the inner surface 46 of the outer panel 14. The flanges 82, 86, 90 allow the inner panel 30 to be joined to the outer panel 14 using structural adhesives or similar bonding techniques, as discussed further below. The forward and rearward portions 74a, 74b of the dished portion 74 each include a relief section 98a, 98b, respectively, to accommodate the ridge 54 of the outer panel.

Figure 5:
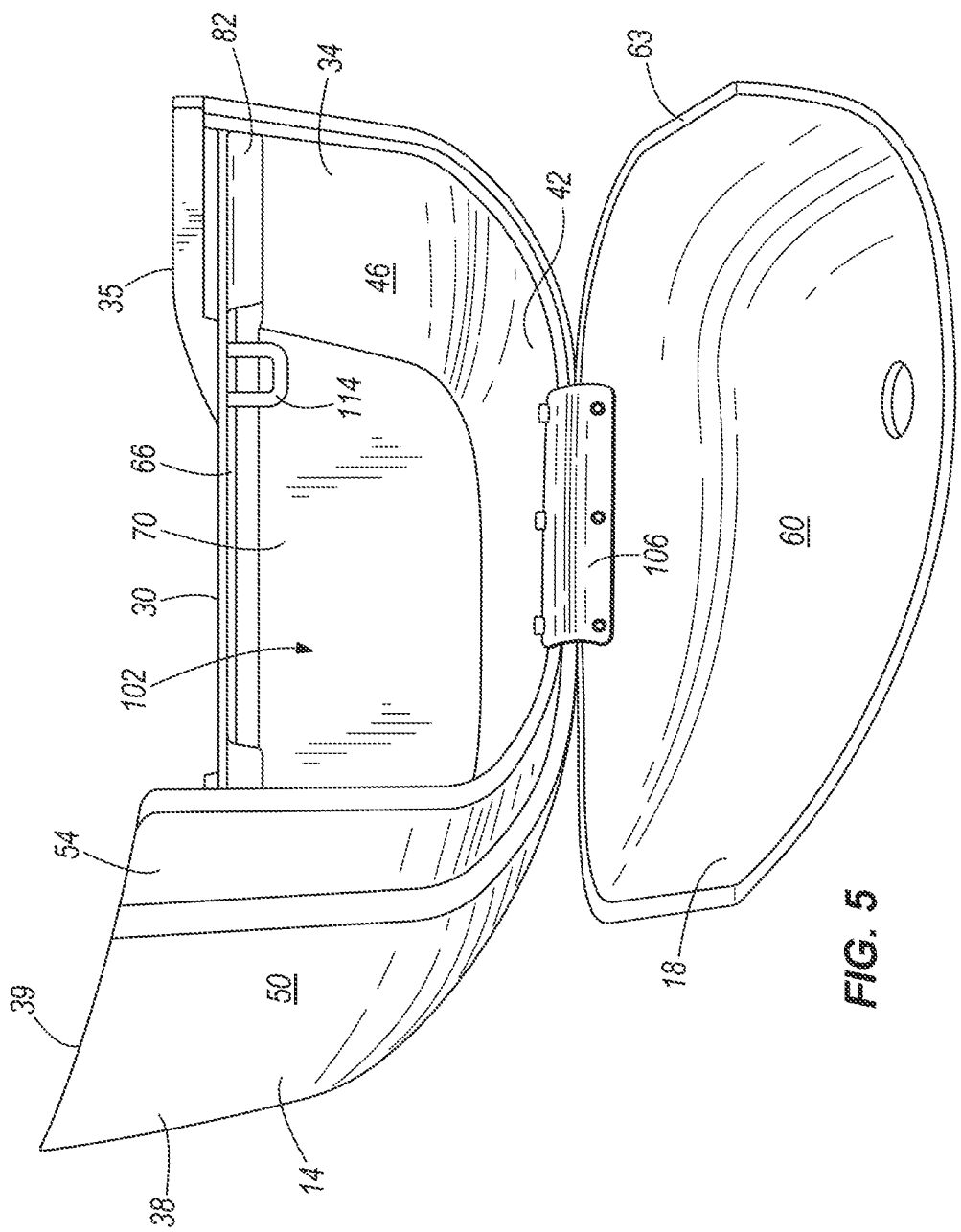
FIG. 5 is a top view of the motorcycle saddlebag of FIG. 1 with a lid in an open position.

With reference also to FIG. 5, when assembled, the outer and inner panels 14, 30 together define a storage cavity 102 that can be opened and closed by pivoting the lid 18 about the hinge 22 (hidden from view in FIG. 5). In the illustrated construction, a pivot-limiting flexible membrane 106, which may be leather, nylon, or another suitably flexible yet durable material, is coupled to the inner surface 46 of the outer panel 14 and the inner surface 60 of the lid 18 to limit the range of motion of the lid 18 relative to the outer panel 14. The illustrated construction of FIG. 5 also includes a strike 114 coupled to the back panel 72. The strike 114 is engaged by the latch assembly 26 (not shown in FIG. 5) to secure the lid 18 in the closed position. Although not illustrated in the figures, the lower edge 63 of the lid 18 may be covered by a resilient sealing member that engages the ridge 54 and/or the outer surface 50 of the outer panel 14 to substantially seal the cavity 102 when the lid 18 is closed. In alternative constructions, a sealing member may also or alternatively be attached to the ridge 54 or another suitable portion of the outer panel 14 and/or the inner panel 30. The sealing member may take on a variety of configurations and may be fastened to the lid 18, the outer panel 14, or the inner panel 30 using adhesives, fasteners, or other suitable coupling methods. In the illustrated construction, the flanges 82, 86, and 90 extend away from the back wall portion 66 and bottom wall portion 70 in a direction that results in the flanges 82, 86, 90 being positioned outside of the cavity 102. It should be appreciated that the flanges 82, 86, 90 could also or alternatively be configured such that, once the inner panel 30 is coupled to the outer panel 14, the flanges 82, 86, 90 would be positioned inside the cavity 102.

The above-described exemplary configuration of the outer and inner panels 14, 30 makes the panels particularly well suited for fabrication using a combination of thermoforming methods and structural adhesive bonding. In some embodiments the panels 14, 30 and the lid 18 are formed from ABS (Acrylonitrile Butadiene Styrene) and bonded using a suitable structural adhesive, such as MA 310 two-part methacrylate adhesive, available from PLEXUS of Danvers, Mass. In other embodiments, the structural adhesive may be or include a solvent capable of at least partially dissolving some of the material along the mating surfaces of the panels such that, once cured, the panels are bonded together. One example of a solvent-based structural adhesive includes a solution of ABS dissolved in methyl ethyl ketone. While a variety of suitable materials, structural adhesives, and bonding techniques may be utilized without departing from the spirit and scope of the invention, the use of ABS as the panel material has many inherent advantages. In addition to being a low cost material, the tooling required for thermoforming operations is relatively inexpensive when compared with injection or rotational molded products. The tooling is also relatively simple to modify, if necessary, for minor design changes. The material also has a good strength to weight ratio, and a good surface finish when released from the tooling, thereby minimizing or elimination preparation of the material for painting. The use of structural adhesives and similar bonding techniques allows for relatively simple, low cost manufacturing techniques, and also enhances aesthetics by allowing for hidden bonding lines, as discussed further below.

With reference to FIGS. 1D, 2, and 5, during assembly, adhesive is applied to one or both of the engagement surface 94 of the inner panel 30 and the inner surface 50 of the outer panel 14. The inner panel 30 is then positioned relative to the outer panel 14 to bring the engagement surface 94 into mating engagement with the inner surface 46 (e.g., the position illustrated in FIGS. 1D and 5), and the parts are held in a fixed relationship with one another until the adhesive has fully cured. Once the outer and inner panels 14, 30 are coupled to one another, the lid 18, hinge assembly 26, and other saddlebag components may be installed.

In many applications, the bond between the outer and inner panels 14, 30 created by the structural adhesive will be stronger than the material from which the panels are fabricated (e.g., ABS). The configuration by which the flanges 82, 86, 90 are bonded to the inner surface 46 of the outer panel 14 is such that when the saddlebag 10 is coupled to a motorcycle and loaded with gear, the adhesive bonds are primarily subject to shearing loads that tend to slide the engagement surface relative 94 to the inner surface 46. This configuration generally provides superior durability when compared to other configurations in which the adhesive bonds may be subjected primarily to pealing loads that tend to pull the joined surfaces away from one another.

As illustrated, once assembled the inner panel 30 is recessed relative to the front and rear portions 34, 38 of the outer panel 14, that is, the ends of the front and rear portions 34, 38 extend beyond the inner panel 30. The side portion 42 of the outer panel 14 similarly extends generally downwardly beyond the bottom wall portion 70 of the inner panel 30. In this way, the inner panel 30 and the adhesive bonds between the inner panel 30 and the outer panel 14 are substantially completely hidden from view when the saddlebag 10 is installed on the side of a motorcycle and the lid 18 is closed. Similarly, the bracketry used to secure the saddlebag 10 to the motorcycle, which in some cases is coupled exclusively to the inner panel 30, may also be hidden from view. In some embodiments, this configuration also reduces manufacturing cost because only the outer surfaces of the lid 18 and outer panel 14 require painting and the associated paint preparation processes. The thickness of the outer panel 14 is sufficient to prevent any bond lines from "telegraphing" through to the outer surface 50.

The completed assembly of panels 14, 30 and lid 18 may also be trimmed to customize the saddlebag 10 for a particular motorcycle or motorcycle configuration. The recessed configuration of the inner panel 30 relative to the outer panel 14 provides sections of overhanging material that may be cut away after the saddlebag 10 has been assembled such that the saddlebag 10 may be customized for different motorcycles and motorcycle configurations. Although the amount of overhanging material may vary for different saddlebag designs, as shown in FIG. 1E, the illustrated saddlebag 10 includes a section of overhanging outer panel material 118 that extends from the rear portion 38 of the outer panel 14 inwardly relative to the motorcycle, and beyond the inner panel 30 (e.g., to the right in FIG. 1E). In one exemplary process, to adapt the saddlebag 10 for use with a custom exhaust, the overhanging panel material 118 may be trimmed, as illustrated by dashed lines 122, manually or using automated cutting techniques such as CNC water jetting, CNC milling, or other known processes. As another example, the contour of an inner circumferential edge 126 of the saddlebag 10 (see FIG. 1C), which may include portions of both the lid 18 and the outer panel 14, can be modified to fit different motorcycles or motorcycle fenders. Thus, outer panels 14, inner panels 30 and lids 18 that are fabricated and assembled from a single set of thermoforming and adhesive bonding tools can, once assembled, be altered or customized to fit a wide variety of motorcycles, motorcycle fenders, and motorcycle exhaust configurations.

Figure 6:
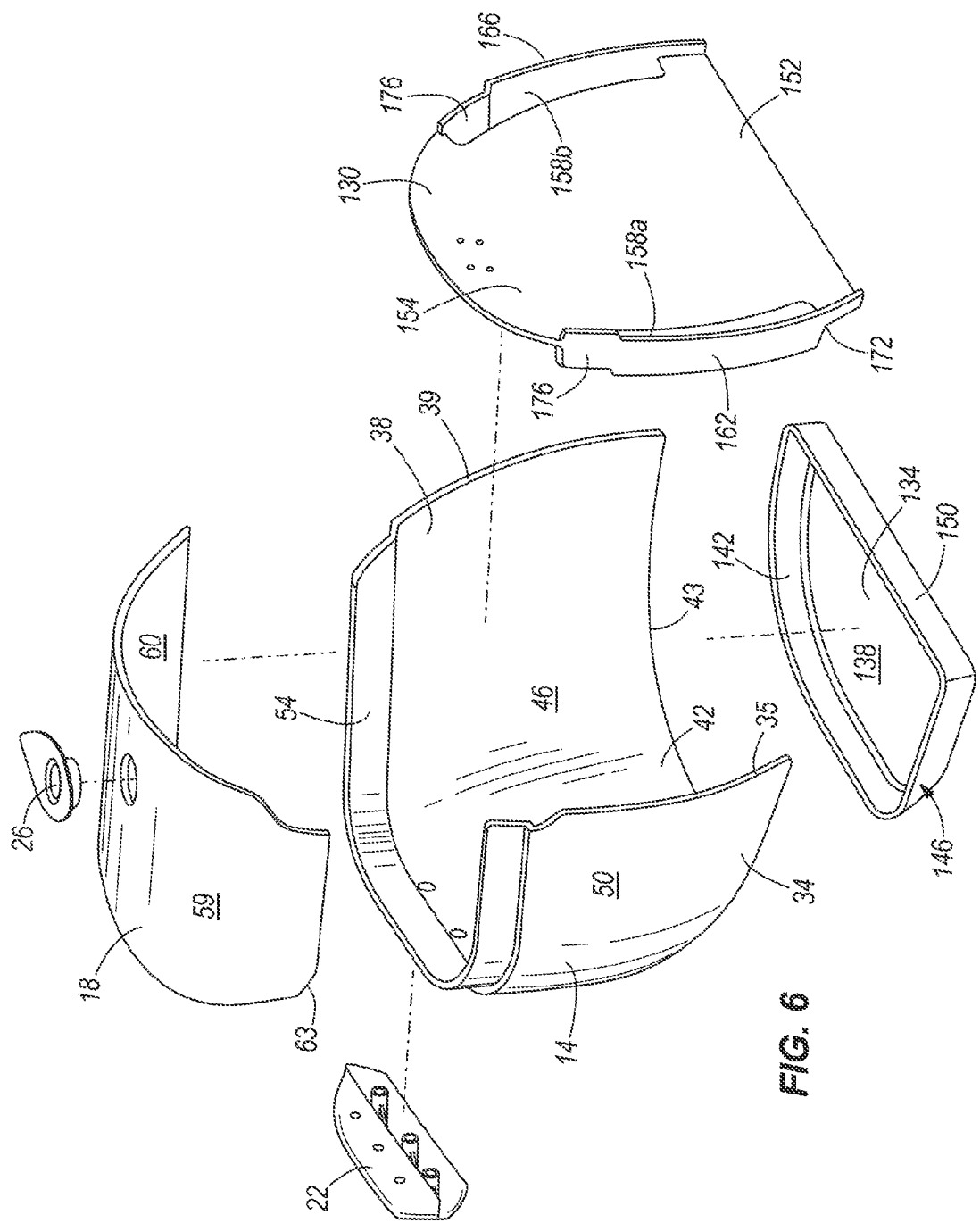
FIG. 6 is an exploded perspective view of an alternative embodiment of the motorcycle saddlebag.

FIG. 6 illustrates an alternative embodiment of the saddlebag 10 in which the L shaped inner panel 30 has been replaced by a back panel 130 and a bottom panel 134, the remaining components, such as the outer panel 14 and the lid 18, are substantially unchanged. The bottom panel 134 includes a bottom surface 138 and an upwardly extending circumferential lip 142. The front, right-side, and rear portions of the circumferential lip 142 define a first engagement surface 146 that engages and is adhered to the inner surface 46 of the outer panel 14 in a manner similar to that described above with respect to the engagement surface 94. The inner portion of the circumferential lip 142 defines a second engagement surface 150 that engages and is adhered to a lower edge portion 152 of the back panel 130.

With reference also to FIGS. 7A-7D, the back panel 130 includes a generally planar back wall 154 and a pair of dished portions 158a, 158b positioned adjacent front and rear edges, respectively, of the back wall 154. Like the dished portions 74a, 74b, the dished portions 158a, 158b define forwardly-facing and rearwardly-facing flanges 162, 166, respectively, that engage and are adhered to the inner surface 46 of the outer panel 14. The lower portion of each flange 162, 166 includes a cutout 172 that receives the circumferential lip 142 of the bottom panel 134 to provide a smooth transition between the flanges 162, 166 and the first engagement surface 146 of the lip 142. The upper portion of each flange 162, 166 includes a relief section 176 that receives the ridge 54 of the outer panel 14, similar to the relief sections 98a, 98b of the inner panel 30. With the exception of the bonding that occurs between the inner portion of the circumferential lip 142 of the bottom panel 134 and the back wall 154 of the back panel 130, assembly, manufacturing, and post assembly customization of the saddlebag 10 of FIG. 6 is substantially the same as that described for the saddlebag 10 of FIGS. 1-5.

What is claimed is:

1. A saddlebag comprising:
an outer panel including a forward portion, a rearward portion, and a side portion, the forward and rearward portions each curving toward and smoothly transitioning into the side portion, the forward portion defining a forward edge, the rearward portion defining a rearward edge, and the forward portion, the rearward portion and the side portion cooperating to define a lower edge, the outer panel including an inner surface at least partially bounded by the forward edge, the rearward edge, and the lower edge;
a bottom panel joined to the outer panel, the bottom panel including an upstanding lip at the perimeter of the bottom panel, and an outwardly-facing portion of a forward, rearward and side portion of the upstanding lip matingly engaged with and secured to the inner surface of the outer panel; and
a back panel joined to the outer panel and bottom panel, the back panel adjacent a rear fender portion of a vehicle when the saddlebag is attached to the vehicle and defines on one end a generally forwardly-facing flange and on an opposite end a generally rearwardly-facing flange, the generally forwardly-facing flange and the generally rearwardly-facing flange each matingly engaged with and secured to the inner surface of the outer panel, and a bottom portion of the back panel matingly engaged with and secured to an outwardly-facing portion of an inner portion of the upstanding lip of the bottom panel; and a lid pivotally coupled to at least one of the outer panel and the back panel.

2. The saddlebag of claim 1, wherein the forward portion extends inwardly and downwardly beyond the bottom panel and back panel, the rearward portion extends inwardly and downwardly beyond the bottom panel and back panel, and the side portion extends downwardly beyond the bottom panel.

3. The saddlebag of claim 1, wherein the bottom panel and back panel are substantially hidden from view by the outer panel when the vehicle saddlebag is attached to the motorcycle.

4. The saddlebag of claim 1, wherein the back panel includes a substantially planar wall and a dished portion that is recessed relative to a surface of the substantially planar wall, the substantially planar wall oriented substantially perpendicular to both the generally forwardly-facing flange and the generally rearwardly-facing flange.

* * * * *